United States Patent
Seta et al.

(10) Patent No.: US 6,723,446 B2
(45) Date of Patent: Apr. 20, 2004

(54) FILM

(75) Inventors: Yasushi Seta, Kanagawa (JP); Masahiko Endoh, Chiba (JP)

(73) Assignee: Idemitsu Petrochemical Co., Ltd., Tokyo (JP)

( * ) Notice: Subject to any disclaimer, the term of this patent is extended or adjusted under 35 U.S.C. 154(b) by 0 days.

(21) Appl. No.: 10/258,608

(22) PCT Filed: May 22, 2001

(86) PCT No.: PCT/JP01/04269

§ 371 (c)(1),
(2), (4) Date: Nov. 5, 2002

(87) PCT Pub. No.: WO01/90227

PCT Pub. Date: Nov. 29, 2001

(65) Prior Publication Data

US 2003/0143415 A1 Jul. 31, 2003

(30) Foreign Application Priority Data

May 23, 2000 (JP) ......................................... 2000-151446
May 26, 2000 (JP) ......................................... 2000-155798

(51) Int. Cl.$^7$ ............................. B32B 27/32; C08J 5/18; C08L 23/10
(52) U.S. Cl. ....................... 428/515; 428/516; 428/520; 428/528; 525/240
(58) Field of Search .......................... 525/240; 428/516, 428/515, 523, 520, 522, 916

(56) References Cited

U.S. PATENT DOCUMENTS

| | | | |
|---|---|---|---|
| 6,150,427 A | 11/2000 | Ito et al. | |
| 6,270,911 B1 | 8/2001 | Seta et al. | |
| 6,287,705 B1 | 9/2001 | Seta et al. | |
| 2003/0124286 A1 * | 7/2003 | Kijima | ........................ 428/36.9 |
| 2003/0143415 A1 * | 7/2003 | Seta et al. | ................... 428/523 |
| 2003/0158343 A1 * | 8/2003 | Kijima | ........................ 525/240 |

FOREIGN PATENT DOCUMENTS

| | | |
|---|---|---|
| EP | 784089 | 7/1997 |
| JP | 7-329177 | 12/1995 |
| JP | 10-7816 | 1/1998 |
| JP | 10-25355 | 1/1998 |
| JP | 11-29667 | 2/1999 |
| JP | 2000-272063 | 10/2000 |

* cited by examiner

Primary Examiner—D. Lawrence Tarazano
(74) Attorney, Agent, or Firm—Oblon, Spivak, McClelland, Maier & Neustadt, P.C.

(57) ABSTRACT

The present invention provides a wrap film or shrink film formed from a resin composition containing [I] a propylene polymer in an amount of 1 to 99 mass %, and [II] an olefin-based polymer in an amount of 99 to 1 mass %, wherein [I] the propylene polymer satisfies the following requirements of: (1) a meso pentad fraction (mmmm) is 0.2 to 0.6, and (2) a racemic pentad fraction (rrrr) and (1−mmmm) satisfy the following relation: [rrrr/(1−mmmm)] ≦0.1. The wrap film or shrink film exhibits excellent characteristics, and does not generate a toxic gas derived from chlorine, such as hydrogen chloride gas or dioxin, when being incinerated.

12 Claims, No Drawings

FILM

TECHNICAL FIELD

The present invention relates to films, in details, a wrap film for commercial or household use, and to a shrink film employed for packaging and other purposes. More particularly, the invention relates to a wrap film which contains no chlorine, which is environmentally friendly, which exhibits excellent safety, and which exhibits characteristics required of wrap film, such as wrapping-ability, transparency, and restoration from deformation; and to a shrink film which contains no chlorine, which is environmentally friendly, which exhibits excellent safety, transparency, glossiness, and low-temperature shrink-packaging characteristics, and which enables packaging of a product having relatively low strength while providing the product with good appearance, without involving deformation of the product.

BACKGROUND ART

Conventionally, vegetables and fruits, meats, fishes, processed foods made from these, and cooked foods such as delicatessen items—which are sold in department stores, supermarkets, and grocery stores—have been placed on lightweight trays formed from foaming resin, and wrapped with film. In the home, when a grocery item is stored in a freezer or a refrigerator, or heated in a microwave oven, the item is placed in a container and wrapped with film.

Such wrapping film is required to exhibit excellent characteristics in terms of, for example, transparency, finishing appearance, wrapping efficiency, resistance to poking, and restoration from deformation when being pushed with a finger. In general, a polyvinyl-chloride-based resin such as polyvinyl chloride (PVC) or polyvinylidene chloride (PVDC) is widely employed for producing a film satisfactorily exhibiting such wrapping characteristics.

However, since a polyvinyl-chloride-based resin such as polyvinyl chloride (PVC) or polyvinylidene chloride (PVDC) contains chlorine in the molecule, when a film formed from such a resin is incinerated after being used and disposed of, a toxic substance such as hydrogen chloride gas or dioxin is generated, thereby raising environmental problems. Further, elution of a plasticizer, which is incorporated into a wrap film in large amount for softening the film, is problematic from the viewpoint of safety.

In order to solve such problems, attempts to employ a polyethylene film or a polypropylene film have been made, and such a film has been put into practice. Although a polyethylene film exhibits good low-temperature characteristics, it exhibits poor heat resistance, whereas a polypropylene film exhibits poor low-temperature characteristics and high heat resistance. In addition, a polyethylene film or a polypropylene film exhibits unsatisfactory adhesion to, for example, a tray, and adhesion between polyethylene films or between polypropylene films is unsatisfactory.

Therefore, there have been proposed various techniques for incorporating, into a propylene-based resin, ethylene-propylene rubber, a styrene-ethylene-butylene-styrene block copolymer, modified polyolefin, polybutene, a hydrocarbon resin, an adhesion-imparting aid, etc. However, such an additive does not necessarily exhibit sufficient miscibility with a polypropylene-based resin, and raises problems including roughing of a surface, lowering of transparency, lowering of film forming-ability, and bleeding of a low molecular weight compound serving as an adhesion-imparting aid.

Japanese Patent Application Laid-Open (kokai) No. 11-29667 discloses a wrap film formed from a resin composition containing (A) (50 to 98 parts by weight) of a polypropylene-based resin and (B) (2 to 50 parts by weight) of an ethylene-α-olefin copolymer having a density of 0.900 g/cm$^3$ or less; and Japanese Patent Application Laid-Open (kokai) No. 11-29668 discloses a wrap film formed from a resin composition containing (A) (100 parts by weight) of a polypropylene-based resin and (B) (1 to 15 parts by weight) of oil and fat. However, like the cases of the aforementioned conventional techniques, a low-molecular-weight compound such as polybutene or oil and fat must be incorporated into such a wrap film in order to secure adhesion of the wrap film.

Japanese Patent Application Laid-Open (kokai) 2000-44742 discloses a wrap film containing a soft polypropylene-based resin containing (A) 20 to 60 wt. % of a polypropylene having an isotactic index of at least 80; and (B) 40 to 80 wt. % of a copolymer component consisting of (I) 25 to 95 wt. % of a crystalline component which is a copolymer component of ethylene and an olefin having at least four carbon atoms, contains 50 to 95 wt. % of ethylene and has crystalline polyethylene which is insoluble in xylene at 25° C., and (II) 5 to 75 wt. % of an amorphous component which is soluble in xylene at 25° C. When characteristics of the wrap film are evaluated, instead of a single-layer film consisting of the wrap film, a multi-layer film including the wrap film and outer layers formed from a propylene-ethylene-butene-1 copolymer and an ethylene-vinyl acetate copolymer is employed. Therefore, characteristics of the polypropylene-based resin are not reflected in characteristics of the multi-layer film. Furthermore, transparency of the wrap film is not satisfactory.

Although a wrap film formed from a polyolefin-based resin containing no chlorine can solve environmental problems, characteristics of the wrap film are inferior to those of a wrap film formed from a polyvinyl-chloride-based resin. Therefore, in actuality, wrap films formed from a polyvinyl-chloride-based resin are widely used.

Heat shrink packaging employing a heat-shrinkable film (shrink film)—in which an object is wrapped with a shrink film, and the object is caused to pass through a heating furnace so as to shrink the film, whereby the film adheres to the object; or a plurality of objects are bound together with a shrink film—is widely carried out for packaging of cup noodle products or for lamination packaging of, for example, notebooks or tissue paper.

At present, a stretched film formed from, for example, a polyvinyl-chloride-based resin such as polyvinyl chloride (PVC) or polyvinylidene chloride (PVDC), a polyethylene-based resin, or a polypropylene resin is employed as a shrink film in heat shrink packaging. A shrink film is required to exhibit excellent characteristics in terms of, for example, heat shrinking-ability during packaging, melting-breakage resistance, side welding property, hot slip property, transparency after packaging, high glossiness, mechanical strength, and appearance after packaging (i.e., the edge of the film adheres to an object without forming wrinkles). Generally, a shrink film formed from a polyvinyl-chloride-based resin, which satisfactorily exhibits such characteristics, is employed.

However, since a polyvinyl-chloride-based resin such as polyvinyl chloride (PVC) or polyvinylidene chloride (PVDC) contains chlorine in the molecule, when a film formed from such a resin is incinerated after being used and disposed of, a toxic substance derived from chlorine, such as hydrogen chloride gas or dioxin, generates, thereby raising environmental problems. Furthermore, elution of a plasticizer, which is incorporated into a shrink film in large amount for softening the film, is problematic from the viewpoint of safety. In addition, when a shrink film formed from a polyvinyl-chloride-based resin is heated during heat shrink packaging, the resin issues a foul odor. Therefore, from the environmental viewpoint during packaging, demand has arisen for further improvements to such a shrink film.

In order to solve such problems, attempts to employ a polyethylene film or a polypropylene film have been made, and such a film have been put into practice. Although a polyethylene film exhibits good low-temperature characteristics, it exhibits poor heat resistance and melting-breakage resistance, whereas a polypropylene film exhibits poor low-temperature characteristics and high heat resistance. When heating temperature is increased during shrink packaging of a product by use of such a film, the packaged product is deformed due to heat shrinkage stress, and the resultant product exhibits poor appearance, whereby the value of the product is lowered. Since a polyethylene film or a polypropylene film is inferior to a film formed from a polyvinyl-chloride-based resin in terms of, for example, transparency and glossiness, a limitation is imposed on the applications of a polyethylene film or a polypropylene film.

In view of the foregoing problems, various improvements to a shrink film formed from a polypropylene-based resin have been proposed. For example, (i) Japanese Patent Application Laid-Open (kokai) No. 7-304882 discloses a polyolefin-based resin stretched shrink film exhibiting specific physical properties and containing 0.01 to 5 wt. % of a polybutene component, 1 to 70 wt. % of a polypropylene component, and 25 to 98.99 wt. % of a propylene-ethylene random copolymer component, in which the propylene-ethylene random copolymer component is composed of a random copolymer containing 10 to 40 mol % of an ethylene monomer unit and 90 to 60 mol % of a propylene monomer unit.

(ii) Japanese Patent Application Laid-Open (kokai) No. 9-176335 discloses a shrinkable film predominantly comprising crystalline polypropylene wherein a peak temperature of an elution curve measured by a temperature rising elution fractionation method using o-dichlorobenzene serving as a solvent is 90 to 110° C. and an eluting integrated weight fraction is 0 to 10 wt. % at 20° C. or lower, 60 to 80 wt. % at temperature range within 20 to 100° C., and 10 to 40 wt. % at temperature range within 100 to 130° C. as calculated from the elution curve. Specifically, the crystalline polypropylene is formed of a block copolymer containing 1 to 70 mass % of (a) a polypropylene component or a propylene-based random copolymer containing a propylene monomer unit in an amount of more than 90 mol %, and 30 to 99 mass % of (b) a random copolymer containing an ethylene monomer unit in an amount of 10 to 40 mol %.

(iii) Japanese Patent Application Laid-Open (kokai) No. 10-152531 discloses a stretched film formed from a propylene-ethylene random copolymer in which the ethylene unit content of the copolymer, the melt index, the boiled diethyl ether extraction amount, and the melting point satisfy specific relations, and the isotactic triad fraction is at least 98 mol %.

Each of the aforementioned polypropylene resin films predominantly contains a copolymer of propylene and another α-olefin, and is improved in the point that stretching temperature; i.e., heating temperature during shrink packaging, can be reduced. However, as is clear from the Examples described in these publications, transparency and glossiness of these films are not satisfactory. Therefore, the value of a product packaged with any of these films is lower than that of the product packaged with a conventionally employed polyvinyl-chloride-based resin film.

DISCLOSURE OF THE INVENTION

An object of the present invention is to provide a wrap film which exhibits characteristics required for wrap film, such as wrapping-ability, transparency, restoration from deformation, and poking resistance, which contains no chlorine, which, when being incinerated, does not generate a toxic substance derived from chlorine, such as hydrogen chloride or dioxin, and which is environmentally friendly.

Another object of the present invention is to provide a shrink film formed from an olefin-based resin, which exhibits excellent heat shrinking-ability required of shrink film, which is shrinkable at low temperature, which is improved as compared with a conventional polypropylene-based resin film in terms of, for example, transparency and glossiness, which exhibits characteristics comparable to those of a polyvinyl-chloride-based resin film, which contains no chlorine, which, when being incinerated, does not generate a toxic substance such as hydrogen chloride or dioxin, and which is environmentally friendly.

As a result of extensive investigations for attaining the aforementioned objects, the present inventors have found that providing a film formed from a composition containing a specific propylene polymer and an olefin-based polymer can attain the objects. The present invention has been accomplished on the basis of this finding. Accordingly, the present invention provides the following films.

[1] A wrap film formed from a resin composition comprising
[I] a propylene polymer in an amount of 1 to 99 mass %, and
[II] an olefin-based polymer in an amount of 99 to 1 mass %,
wherein [I] the propylene polymer satisfies the following requirement of:
(1) a meso pentad fraction (mmmm) is 0.2 to 0.6, and
(2) a racemic pentad fraction (rrrr) and (1−mmmm) satisfy the following relation:

$$[rrrr/(1-mmmm)] \leq 0.1.$$

[2] The wrap film as defined in the item [1], wherein [I] the propylene polymer satisfies the following requirement of:
(3) an intrinsic viscosity [η] measured at 135° C. in tetralin is 1 to 3 deciliter/g.
[3] The wrap film as defined in the item [1] or the item [2], wherein [I] the propylene polymer satisfies the following requirement of:
(4) an amount of a component which is eluted at 25° C. or lower through temperature rise chromatography (W25) is 20 to 100 mass %.
[4] The wrap film as defined in any one of the items [1] to [3], wherein [I] the propylene polymer is polymerized by the use of a metallocene catalyst containing a promoter and a transition metallic compound in which a cross-linking structure is formed via two cross-linking groups.
[5] The wrap film as defined in any one of the items [1] to [4], wherein [II] the olefin-based polymer is a propylene-based polymer.
[6] A multi-layer wrap film comprising at least one layer formed from a resin composition as recited in any one of the items [1] to [5].

As a result of extensive investigations for attaining the aforementioned objects, the present inventors have also found that the objects can be attained by providing a stretched film produced through stretching of a film formed from a resin composition containing a specific propylene polymer and an olefin-based polymer. The present invention has been accomplished on the basis of this finding. Accordingly, the present invention provides the following films.

[7] A stretched shrink film formed from a resin composition comprising [I] a propylene polymer in an amount of 1 to 99 mass %, and [II] an olefin-based polymer in an amount of 99 to 1 mass %, wherein [I] the propylene polymer satisfies the following requirements of:
(1) a meso pentad fraction (mmmm) is 0.2 to 0.6, and
(2) a racemic pentad fraction (rrrr) and (1−mmmm) satisfy the following relation:

$$[rrrr/(1-mmmm)] \leq 0.1.$$

[8] The shrink film as defined in the item [7], wherein [I] the propylene polymer satisfies the following requirement of:
(3) an intrinsic viscosity [η] measured at 135° C. in tetralin is 1 to 3 deciliter/g.

[9] The shrink film as defined in the item [7] or item [8], wherein [I] the propylene polymer satisfies the following requirement of:
(4) an amount of a component which is eluted at 25° C. or lower through temperature rise chromatography (W25) is 20 to 100 mass %.

[10] The shrink film as defined in any one of the items [7] to [9], wherein [I] the propylene polymer is polymerized by the use of a metallocene catalyst containing a promoter and a transition metallic compound in which a cross-linking structure is formed via of two cross-linking groups.

[11] The shrink film as defined in any one of the items [7] to [10], wherein [II] the olefin-based polymer is a propylene-based polymer.

[12] A multi-layer shrink film comprising at least one layer formed from a resin composition as recited in any one of the items [7] to [11].

BEST MODE FOR CARRYING OUT THE INVENTION

The wrap film or shrink film of the present invention is formed from a resin composition containing [I] a specific propylene polymer in an amount of 99 to 1 mass % and [II] an olefin-based polymer in an amount of 1 to 99 mass %. That is, the wrap film or shrink film of the present invention is formed from a resin composition containing the specific propylene polymer as an essential component. The wrap film and shrink film of the present invention will next be described in detail.

The [I] specific propylene polymer employed for forming the wrap film or shrink film of the present invention satisfies the following requirements of:
(1) a meso pentad fraction (mmmm) is 0.2 to 0.6, and
(2) a racemic pentad fraction (rrrr) and (1−mmmm) satisfy the following relation:

$$[rrrr/(1-mmmm)] \leq 0.1.$$

In [I] the propylene polymer employed in the present invention, preferably, the meso pentad fraction (mmmm) is 0.3 to 0.5. The ratio of the racemic pentad fraction (rrrr) to (1−mmmm); i.e., [rrrr/(1−mmmm)], is preferably 0.08 or less, more preferably 0.06 or less, much more preferably 0.05 or less.

When (1) the meso pentad fraction (mmmm) of [I] the propylene polymer exceeds 0.6, and (2) the racemic pentad fraction (rrrr) and (1−mmmm) fails to satisfy the above-described relation, a film formed from the resin composition may fail to secure characteristics required for wrap film, such as wrapping-ability, flexibility, transparency, restoration from deformation, and resistance to poking. When (1) the meso pentad fraction (mmmm) is less than 0.2, since film formation stability is lowered, problems occur due to bleeding of an additive, and strength is lowered, rendering the resultant film unsuitable as a wrap film.

In the case where (1) the meso pentad fraction (mmmm) of [I] the propylene polymer exceeds 0.6, and (2) the racemic pentad fraction (rrrr) and (1−mmmm) fails to satisfy the above-described relation, when a product is packaged with a shrink film formed from the resin composition, the packaged product tends to be deformed due to heat shrinkage of the shrink film. Therefore, the product which has undergone heat shrink packaging exhibits poor appearance, and the product may be broken. When (1) the meso pentad fraction (mmmm) is less than 0.2, since film formation stability is lowered, problems occur due to bleeding of an additive, and strength is lowered, rendering the resultant film unsuitable as a shrink film.

The meso pentad fraction (mmmm) which specifies [I] the propylene polymer employed in the present invention is obtained by means of a method proposed in "Macromolecules, 6, 925 (1973)" by A. Zambelli, et al., and is defined as the meso fraction of a pentad unit of a polypropylene molecular chain measured on the basis of the signal attributed to the methyl group of the propylene polymer in the $^{13}$C-NMR spectrum. The greater the meso pentad fraction, the higher the stereoregularity of the propylene polymer. When the meso pentad fraction (mmmm) of the propylene polymer is less than 0.2, formation of a film may be difficult, due to stickiness of the film. In contrast, when the meso pentad fraction (mmmm) exceeds 0.6, due to lowering of flexibility and adhesion, wrapping-ability of the resultant film may become unsatisfactory.

The racemic pentad fraction (rrrr) which specifies the propylene polymer employed in the present invention is the racemic fraction of a pentad unit of a polypropylene molecular chain. The value [rrrr/(1−mmmm)] is obtained on the basis of the aforementioned meso fraction and racemic fraction of a pentad unit, and is employed as an index for expressing uniformity in stereoregularity distribution of the propylene polymer. The greater the value [rrrr/(1−mmmm)], the higher the stereoregularity of the propylene polymer. When the value [rrrr/(1−mmmm)] is large, like the case where conventional polypropylene is produced through the use of a conventional catalyst, a mixture of high-stereoregular polypropylene (PP) and amorphous polypropylene (APP) is produced. As a result, film forming-ability is lowered due to high stickiness of the mixture, and the resultant film exhibits poor transparency. When the value [rrrr/(1−mmmm)] of [I] the propylene polymer exceeds 0.1, the resultant film becomes sticky.

The $^{13}$C-NMR spectrum of the propylene polymer is measured by means of peak attribution proposed in "Macromolecules, 8, 687 (1975)" by A. Zambelli, et al., and measured by the use of the following apparatus under the following conditions.

Apparatus: JNM-EX400-Model $^{13}$C-NMR spectrometer (produced by JEOL Ltd.)
Method: Complete proton decoupling method
Concentration: 220 mg/milliliter Solvent: A mixed solvent of 1,2,4-trichlorobenzene and bi-benzene (with mass ratio of 90:10)

Temperature: 130° C.

Pulse width: 45°

Pulse interval: 4 seconds

Integration: 10,000 times

Preferably, [I] the specific propylene polymer employed in the present invention satisfies, in addition to the aforementioned requirements, the following requirement:

(3) an intrinsic viscosity [η] measured at 135° C. in tetralin is 1 to 3 deciliter/g. In the case where a wrap film is formed, the intrinsic viscosity [η] affects forming-ability of the film. When T-die casting molding is performed, the intrinsic viscosity [η] is more preferably 1.0 to 2.5 deciliter/g. When inflation molding is performed, the intrinsic viscosity [η] is more preferably 1.5 to 3.0 deciliter/g. In the case where a shrink film is formed, the intrinsic viscosity [η] affects forming-ability and stretching-ability of the film. When tenter biaxial stretching or tubular biaxial stretching is performed, the intrinsic viscosity [η] is more preferably 1.5 to 3.0 deciliter/g. When the intrinsic viscosity [η] is less than 1 deciliter/g, film forming-ability is lowered, whereas when the intrinsic viscosity [η] exceeds 3 deciliter/g, melting viscosity becomes high, fluidity is lowered, and film forming-ability is lowered.

Preferably, [I] the propylene polymer satisfies, in addition to the aforementioned requirement (1), (2), and (3), the following requirement of:

(4) an amount of a component which is eluted at 25° C. or lower through temperature rise chromatography (W25) is 20 to 100 mass %. More preferably, W25 is 50 to 100 mass %. The term "W25" is defined as the amount of an eluted component (mass %) which is not adsorbed onto a filler contained in a TREF column (column temperature: 25° C.), and W25 is obtained on the basis of an elution curve prepared through temperature rise chromatography performed by means of the apparatus and operation method and under the measurement conditions which are described below in Examples. W25 is an index for expressing whether or not the propylene polymer is soft. When W25 is large, the amount of a component of low elastic modulus is increased, and/or uniformity of stereoregularity distribution fails to be attained satisfactorily. In the present invention, when W25 is less than 20%, the propylene polymer fails to exhibit, for example, flexibility.

Preferably, [I] the specific propylene polymer employed in the present invention also satisfies the following requirements.

(i) A molecular weight distribution (Mw/Mn) as measured through gel permeation chromatography (GPC) is preferably 4 or less, more preferably 3.5 or less. When the molecular weight distribution (Mw/Mn) exceeds 4, film forming-ability may be lowered. The molecular weight distribution (Mw/Mn) is obtained by means of gel permeation chromatography (GPC) as described below in Examples.

(ii) A melting endothermic amount (ΔH) obtained by a differential scanning calorimeter (DSC) measurement of the polymer is preferably 30 J/g or less. The value ΔH is an index for expressing whether or not the propylene polymer is soft. When the value ΔH grows large, it means that the elastic modulus of the propylene polymer is high, and the softness of the polymer reduces.

(iii) The propylene polymer may have a melting point (Tm). From the viewpoint of softness of the polymer, preferably, the polymer has no melting point or a melting point (Tm) as low as 100° C. or less. The values of ΔH and Tm are obtained by means of the DSC measurement method described below in Examples.

No particular limitation is imposed on [I] the propylene polymer employed in the present invention, so long as the polymer satisfies the aforementioned specific requirement (1) and (2). The propylene polymer may be copolymerized with a comonomer (2 mass % or less) other than propylene. Examples of the comonomer include ethylene, 1-butene, 1-pentene, 4-methyl-1-pentene, 1-hexene, 1-octene, 1-decene, 1-dodecene, 1-tetradecene, 1-hexadecene, 1-octadecene, and 1-eicosene. The propylene polymer may be a copolymer obtained through copolymerization of propylene with one or more of these comonomers.

No particular limitation is imposed on the production method for [I] the propylene polymer employed in the present invention, so long as the polymer satisfies the aforementioned requirement (1) and (2). Preferably, the propylene polymer is produced through, for example, a known method (see WO99/67303) in which propylene is subjected to polymerization or copolymerization by the use of a metallocene catalyst containing (A) a transition metallic compound in which a cross-linking structure is formed via two cross-linking groups and (B) a promoter. Specifically, the propylene polymer is produced through a method in which polymerization of propylene or copolymerization of propylene with a small amount of another α-olefin is performed in the presence of a polymerization catalyst containing (A) a transition metallic compound and (B) a promoter component selected from among (B-1) a compound capable of forming an ionic complex through reaction with (A) the transition metallic compound or a derivative thereof and (B-2) an aluminoxane, (A) the transition metallic compound being represented by the following formula (I):

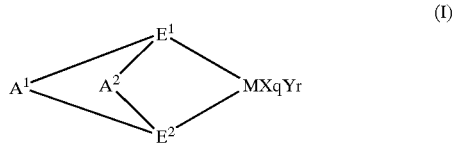

wherein M represents a metal selected from among elements belonging to groups 3 through 10 in the periodic table or elements belonging to the lanthanide series; each of $E^1$ and $E^2$, which may be identical with or different from each other, represents a ligand selected from among a substituted cyclopentadienyl group, an indenyl group, a substituted indenyl group, a heterocyclopentadienyl group, a substituted heterocyclopentadienyl group, an amido group, a phosphide group, a hydrocarbon group, and a silicon-containing group, $E^1$ and $E^2$ form a cross-linking structure via $A^1$ and $A^2$; X represents a σ-bonding ligand (or σ-bonding ligands), and if a plurality of ligands are represented by X, the ligands may be identical or differ from one another, and a ligand represented by X may be cross-linked with another ligand represented by X, a ligand represented by $E^1$, a ligand represented by $E^2$, or a Lewis base represented by Y; Y represents a Lewis base (or Lewis bases), and if a plurality of bases are represented by Y, the bases may be identical or differ from one another, and a base represented by Y may be cross-linked with another base represented by Y, a ligand represented by $E^1$, a ligand represented by $E^2$, or a ligand represented by X; each of $A^1$ and $A^2$, which may be identical with or different from each other, is a divalent cross-linking group capable of bonding two ligands, and represents a hydrocarbon group having 1 to 20 carbon atoms, a halogen-containing hydrocarbon group having 1 to 20 carbon atoms, a silicon-containing group, a germanium-containing group, a tin-containing group, —O—, —CO—, —S—, —SO2—, —Se—, —NR$^1$—, —PR$^1$—, —P(O)R$^1$—, —BR$^1$—, or —AlR$^1$— (wherein R$^1$ represents a hydrogen atom, a halogen atom, a hydrocarbon group having 1 to 20 carbon atoms, or a halogen-containing hydrocarbon group having 1 to 20 carbon atoms); q represents an integer of 1 through 5 and [(the valence of M) −2]; and r represents an integer of 0 through 3.

Specific examples of the transition-metallic compound represented by the formula (I) include (1,2'-dimethylsilylene)(2,1'-dimethylsilylene)bis(3-n-butylindenyl)zirconium dichloride; (1,2'-dimethylsilylene)(2,1'-dimethylsilylene)bis(3-trimethylsilylmethylindenyl)zirconium dichloride; (1,2'-dimethylsilylene)(2,1'-dimethylsilylene)bis(3-phenylindenyl)zirconium dichloride; (1,2'-dimethylsilylene)(2,1'-dimethylsilylene)bis(4,5-benzoindenyl)zirconium dichloride; (1,2'-dimethylsilylene)(2,1'-dimethylsilylene)bis(4-isopropylindenyl)zirconium dichloride; (1,2'-dimethylsilylene)(2,1'-dimethylsilylene)bis(5,6-dimethylindenyl)zirconium dichloride; (1,2'-dimethylsilylene)(2,1'-dimethylsilylene)bis(4,7-di-i-propylindenyl)zirconium dichloride; (1,2'-dimethylsilylene)(2,1'-dimethylsilylene)bis(4-phenylindenyl)zirconium dichloride; (1,2'-dimethylsilylene)(2,1'-dimethylsilylene)bis(3-methyl-4-i-propylindenyl)zirconium dichloride; (1,2'-dimethylsilylene)(2,1'-dimethylsilylene)bis(5,6-benzoindenyl)zirconium dichloride; (1,2'-dimethylsilylene)(2,1'-isopropylidene)-bis(indenyl)zirconium dichloride; (1,2'-dimethylsilylene)(2,1'-isopropylidene)-bis(3-methylindenyl)zirconium dichloride; (1,2'-dimethylsilylene)(2,1'-isopropylidene)-bis(3-i-propylindenyl)zirconium dichloride; (1,2'-dimethylsilylene)(2,1'-isopropylidene)-bis(3-n-butylindenyl)zirconium dichloride; (1,2'-dimethylsilylene)(2,1'-isopropylidene)-bis(3-trimethylsilylmethylindenyl)zirconium dichloride; and compounds obtained by substituting titanium or hafnium for zirconium constituting the aforementioned compounds.

Examples of (B-1) the compound capable of forming an ionic complex through reaction with (A) the transition metallic compound or a derivative thereof include triethylammonium tetraphenylborate, tri-n-butylammonium tetraphenylborate, trimethylammonium tetraphenylborate, tetraethylammonium tetraphenylborate, methyl(tri-n-butyl)ammonium tetraphenylborate, and benzyl(tri-n-butyl)ammonium tetraphenylborate. These (B-1) compounds may be employed singly or in combination of two or more species.

Examples of (B-2) the aluminoxane include methyl aluminoxane, ethyl aluminoxane, and isobutyl aluminoxane. These aluminoxanes may be employed singly or in combination of two or more species.

The aforementioned polymerization catalyst may contain, in addition to the aforementioned components (A) and (B), an organic aluminum compound serving as a component (C). Examples of the organic aluminum compound serving as the component (C) include trimethylaluminum, triethylaluminum, triisopropylaluminum, triisobutylaluminum, dimethylaluminum chloride, diethylaluminum chloride, methylaluminum dichloride, ethylaluminum dichloride, dimethylaluminum fluoride, diisobutylaluminum hydride, diethylaluminum hydride, and ethylaluminum sesquichloride. These organic aluminum compounds may be employed singly or in combination of two or more species.

When polymerization of propylene is carried out, at least one component of the aforementioned catalyst may be supported on an appropriate carrier. No particular limitation is imposed on the type of the carrier, and an inorganic oxide carrier, an inorganic carrier other than an inorganic oxide carrier, or an organic carrier may be employed. Particularly, an inorganic oxide carrier or an inorganic carrier other than an inorganic oxide carrier is preferred.

No particular limitation is imposed on the polymerization method, and any known method such as a slurry polymerization method, a vapor-phase polymerization method, a bulk polymerization method, a solution polymerization method, or a suspension polymerization method may be employed. Of these, a bulk polymerization method and a solution polymerization method are preferred.

Regarding polymerization conditions, the polymerization temperature is typically −100 to 250° C., preferably −50 to 200° C., more preferably 0 to 130° C. The ratio of raw material to catalyst; i.e., the ratio by mol of the raw material monomer/the aforementioned component (A), is preferably 1 to $10^8$, more preferably 100 to $10^5$ The polymerization time is typically five minutes to 10 hours. The reaction pressure is typically ambient pressure to 20 MPa (gauge), preferably ambient pressure to 10 MPa (gauge).

Next will be described the other component of the resin composition for forming the wrap film or shrink film of the present invention. Examples of the other component (i.e., [II] the olefin-based polymer) include polypropylene, a propylene-α-olefin copolymer, a propylene-ethylene-diene copolymer, high-pressure-processed low-density polyethylene, high-density polyethylene, an ethylene-α-olefin copolymer having a density of 850 to 940 kg/m$^3$, an ethylene-vinyl acetate copolymer, and a hydrogenated styrene-based elastomer. Of these, polypropylene, a propylene-α-olefin copolymer, and an ethylene-α-olefin copolymer having a density of 850 to 940 kg/m$^3$ are preferred, and a propylene-based polymer is particularly preferred. These olefin-based polymers may be employed in combination of two or more species.

The resin composition for forming the wrap film or shrink film of the present invention contains [I] the propylene polymer in an amount of 1 to 99 mass % and [II] the olefin-based polymer in an amount of 99 to 1 mass %. In the case where a wrap film is formed, preferably, the composition containing [I] the propylene polymer in an amount of 25 to 96 mass % and [II] the olefin-based polymer in an amount of 75 to 4 mass % is employed. More preferably, the composition containing [I] the propylene polymer in an amount of 40 to 92 mass % and [II] the olefin-based polymer in an amount of 60 to 8 mass % is employed. Much more preferably, the composition containing [I] the propylene polymer in an amount of 50 to 90 mass % and [II] the olefin-based polymer in an amount of 50 to 10 mass % is employed.

In the case where a shrink film is formed, preferably, the composition containing [I] the propylene polymer in an amount of 20 to 96 mass % and [II] the olefin-based polymer in an amount of 80 to 4 mass % is employed. More preferably, the composition containing [I] the propylene polymer in an amount of 30 to 94 mass % and [II] the olefin-based polymer in an amount of 70 to 6 mass % is employed. Much more preferably, the composition containing [I] the propylene polymer in an amount of 40 to 92 mass % and [II] the olefin-based polymer in an amount of 60 to 8 mass % is employed.

In the case where the incorporation amount of [I] the propylene polymer is small in the resin composition, when a wrap film is formed from the composition, characteristics of the resultant wrap film, such as flexibility, transparency, restoration from deformation, and wrapping-ability, are deteriorated. In contrast, in the case where the incorporation amount of [I] the propylene polymer is large in the resin composition, film formation may be disturbed, and difficulty may be encountered in consistent production of a wrap film at high productivity. Therefore, the incorporation amount of [I] the propylene polymer is appropriately determined in consideration of, for example, the meso pentad fraction and the intrinsic viscosity [η] of [I] the propylene polymer, and the type, molecular weight, and melting viscosity of [II] the olefin-based polymer, particularly in consideration of wrapping-ability.

In the case where the incorporation amount of [I] the propylene polymer is small in the resin composition, when a shrink film is formed from the composition, a product packaged with the shrink film tends to be deformed or broken due to heat shrinkage of the film, and characteristics of the shrink film, such as packaging appearance, are deteriorated. In contrast, in the case where the incorporation amount of [I] the propylene polymer is large in the resin composition, film formation stability and stretching-ability are lowered, and difficulty may be encountered in consistent production of a wrap film at high productivity. Therefore, the incorporation amount of [I] the propylene polymer is appropriately determined in consideration of, for example, the meso pentad fraction and the intrinsic viscosity [η] of [I] the propylene polymer, and the type, molecular weight, and melting viscosity of [II] the olefin-based polymer, particularly in consideration of packaging-ability, film forming-ability, and stretching-ability.

When the wrap film or shrink film of the present invention is produced, if desired, a variety of known additives may be incorporated into the resin composition.

Examples of the additive that may be incorporated into the resin composition include an antioxidant, a neutralizing agent, a slip agent, an anti-blocking agent, an anti-fog agent, a lubricant, a nucleating agent, and an antistatic agent. These additives may be employed singly or in combination of two or more species. Examples of the antioxidant include a phosphorus-based antioxidant, a phenol-based antioxidant, and a sulfur-based antioxidant.

Specific examples of the phosphorus-based antioxidant include tris(nonylphenyl) phosphite; tris(2,4-di-t-butylphenyl) phosphite; distearylpentaerythritol diphosphite; bis(2,4-di-t-butylphenyl)pentaerythritol phosphite; bis(2,6-di-t-butyl-4-methylphenyl)pentaerythritol phosphite; 2,2-methylenebis(4,6-di-t-butylphenyl)octyl phosphite; tetrakis(2,4-di-t-butylphenyl)-4,4-biphenylene-di-phosphonite; Adekastab 1178 (Asahi Denka Co., Ltd.); Sumilizer TNP (Sumitomo Chemical Co., Ltd.); JP-135 (Johoku Kagaku K.K.); Adekastab 2112 (Asahi Denka Co., Ltd.); JPP-2000 (Johoku Kagaku K.K.); Weston618 (General Electric Co.); Adekastab PEP-24G (Asahi Denka Co., Ltd.); Adekastab PEP-36 (Asahi Denka Co., Ltd.); Adekastab HP-10 (Asahi Denka Co., Ltd.); SandstabP-EPQ (Sandoz Ltd.); and Phosphite 168 (Ciba Specialty Chemicals Corp.).

Specific examples of the phenol-based antioxidant include 2,6-di-t-butyl-4-methylphenol; n-octadecyl-3-(3',5'-di-t-butyl-4'-hydroxyphenyl) propionate; tetrakis [methylene-3-(3,5-di-t-butyl-4-hydroxyphenyl) propionate] methane; tris(3,5-di-t-butyl-4-hydroxybenzyl) isocyanurate; 4,4'-butylidenebis-(3-methyl-6-t-butylphenol); triethylene glycol-bis[3-(3-t-butyl-4-hydroxy-5-methylphenyl) propionate]; 3,9-bis{2-[3-(3-t-butyl-4-hydroxy-5-methylphenyl)propionyloxy]-1,1-dimethylethyl}-2,4,8,10-tetraoxaspiro[5,5]undecane; Sumilizer BHT (Sumitomo Chemical Co., Ltd.); Yoshinox BHT (Yoshitomi Pharmaceutical Industries, Ltd.); Antage BHT (Kawaguchi Chemical Industry Co., Ltd.); Irganox 1076 (Ciba Specialty Chemicals Corp.); Irganox 1010 (Ciba Specialty Chemicals Corp.); Adekastab AO-60 (Asahi Denka Co., Ltd.); Sumilizer BP-101 (Sumitomo Chemical Co., Ltd.); Tominox TT (Yoshitomi Pharmaceutical Industries, Ltd.); TTHP (Toray Industries, Inc.); Irganox 3114 (Ciba Specialty Chemicals Corp.); Adekastab AO-20 (Asahi Denka Co., Ltd.); Adekastab AO-40 (Asahi Denka Co., Ltd.); Sumilizer BBM-S (Sumitomo Chemical Co., Ltd.); Yoshinox BB (Yoshitomi Pharmaceutical Industries, Ltd.); Antage W-300 (Kawaguchi Chemical Industry Co., Ltd.); Irganox 245 (Ciba Specialty Chemicals Corp.); Adekastab AO-70 (Asahi Denka Co., Ltd.); Tominox 917 (Yoshitomi Pharmaceutical Industries, Ltd.); Adekastab AO-80 (Asahi Denka Co., Ltd.); and Sumilizer GA-80 (Sumitomo Chemical Co., Ltd.).

Specific examples of the sulfur-based antioxidant include dilauryl 3,3'-thiodipropionate; dimyristyl 3,3'-thiodipropionate; distearyl 3,3'-thiodipropionate; pentaerythritol tetrakis(3-lauryl thiopropionate); Sumilizer TPL (Sumitomo Chemical Co., Ltd.); Yoshinox DLTP (Yoshitomi Pharmaceutical Industries, Ltd.); Antiox L (Nippon Oil & Fats Co., Ltd.); Sumilizer TPM (Sumitomo Chemical Co., Ltd.); Yoshinox DMTP (Yoshitomi Pharmaceutical Industries, Ltd.); Antiox M (Nippon Oil & Fats Co., Ltd.); Sumilizer TPS (Sumitomo Chemical Co., Ltd.); Yoshinox DSTP (Yoshitomi Pharmaceutical Industries, Ltd.); Antiox S (Nippon Oil & Fats Co., Ltd.); Adekastab AO-412S (Asahi Denka Co., Ltd.); SEENOX 412S (Shipro Kasei Kaisha, Ltd.); and Sumilizer TDP (Sumitomo Chemical Co., Ltd.).

Of these, Irganox 1010 (substance name: pentaerythritolyl tetrakis[3-(3,5-di-t-butyl-4-hydroxyphenyl)propionate]); Irgaphos 168 (substance name: tris(2,4-di-t-butylphenyl) phosphite); Irganox 1076 (substance name: octadecyl 3-(3, 5-di-t-butyl-4-hydroxyphenyl)propionate); Irganox 1330 (substance name: 1,3,5-trimethyl-2,4,6-tris(3,5-di-t-butyl-4-hydroxybenzyl)benzene); Irganox 3114 (substance name: tris(3,5-di-t-butyl-4-hydroxybenzyl) isocyanurate); and P-EPQ (substance name: tetrakis(2,4-di-t-butylphenyl) 4,4'-biphenylene-di-phosphite) are particularly preferred.

In the present invention, when an antioxidant is employed, the amount of antioxidant incorporated into the aforementioned propylene polymer resin composition is 0.001 to 1 parts by mass on the basis of 100 parts by mass of the composition. Addition of an oxidant has, for example, the effect of preventing yellowing of the composition.

Specific examples of combinations of the aforementioned antioxidants are as follows.

Ex. 1: Irganox 1010 (1,000 ppm)
PEP-Q (1,000 ppm)
Ex. 2: Irganox 1076 (1,200 ppm)
PEP-Q (600 ppm)
Irgaphos 168 (800 ppm)
Ex. 3: Irganox 1010 (400 to 1,000 ppm)
Irgaphos 168 (700 to 1,500 ppm)

Examples of particularly preferred neutralizing agents include calcium stearate, zinc stearate, magnesium stearate, and hydrotalcite (DHT-4A) (compositional formula: $Mg_{4.5}Al_2(OH)_{13}CO_3 \cdot 3.5\ H_2O$, $Li_2Al_4(OH)_{12}CO_3 \cdot 3\ H_2O$ [Mizukal H-1, product of Mizusawa Industrial Chemicals, Ltd.]).

Examples of particularly preferred anti-blocking agents include Sylysia (a synthetic-silica-based agent, product of Fuji Silysia Chemical Ltd.) and Mizukasil (a synthetic-silica-based agent, product of Mizusawa Industrial Chemicals, Ltd.).

Examples of particularly preferred slip agents include erucamide, oleamide, stearamide, behenamide, ethylene bis stearamide, ethylene bis oleamide, stearyl erucamide, and oleyl palmitamide.

Examples of the anti-fog agent include glycerin fatty acid ester compounds such as (di)glycerin mono(di, tri)oleate, (di)glycerin mono(di, tri)stearate, (di)glycerin mono(di) palmitate, and (di)glycerin mono(di)laurate; sorbitan fatty acid ester compounds such as sorbitan laurate, sorbitan palmitate, sorbitan (tri)stearate, and sorbitan (tri)oleate; ethylene oxide addition products such as polyoxyethylene alkyl(phenyl) ether, polyoxyethylenesorbitan monooleate, and polyoxyethyleneglycerin monostearate; and propylene glycol fatty acid esters such as propylene glycol monolaurate, propylene glycol monopalmitate, propylene glycol monostearate, and propylene glycol monooleate. A plurality of these anti-fog agents may be employed in combination. In the case where a wrap film is formed from the resin composition containing an anti-fog agent, when a product to be displayed is wrapped with the film, haze of the film caused by generation of vapor from the product can be prevented, and transparency of the film can be maintained, whereby the value of the product can be enhanced.

When a nucleating agent is employed, the amount of a nucleating agent incorporated into the resin composition containing [I] the propylene polymer and [II] the olefin-based polymer is typically at least 10 ppm, preferably 10 to 10,000 ppm, more preferably 10 to 5,000 ppm, much more preferably 10 to 2,500 ppm, on the basis of the entirety of the composition.

The resin composition for forming the wrap film or shrink film of the present invention can be produced by dry-blending a mixture of the aforementioned [I] specific propylene polymer, [II] the olefin-based polymer and a predetermined amount of various optional additives employing a melt-kneading apparatus such as an extruder or a banbury mixer.

The wrap film of the present invention can be formed from the resin composition pellets produced above through, for example, T-die cast molding, inflation molding, or calender molding. The wrap film is produced through the following procedure: the resin composition is heated to about 190 to about 270° C., and then subjected to extrusion and cooling. The film may be cooled through air-cooling or water-cooling.

Even when subjected to no stretching, the wrap film of the present invention satisfactorily functions as a wrap film. However, if desired, the wrap film may be subjected to biaxial stretching by means of a known method. Through such stretching, cutting-ability of the wrap film can be improved. The thickness of the wrap film of the present invention is typically 5 to 40 µm, preferably 10 to 20 µm. The thickness of the wrap film is appropriately determined in consideration of, for example, the intended use of the wrap film and the product form thereof.

The shrink film of the present invention can be produced as follows: a base film for stretching is formed from the resin composition pellets produced above by means of a known melt-extrusion method; and subsequently the base film is subjected to stretching in the longitudinal and lateral directions. Examples of the melt-extrusion method that may be employed include T-die cast molding and inflation molding. Through such a method, a base film for stretching having a thickness of 100 to 700 µm, preferably 200 to 500 µm, is formed. The base film is produced through the following procedure: the resin composition is heated to about 190 to about 270° C., and then subjected to extrusion and cooling. The film may be cooled through air-cooling or water-cooling.

Subsequently, the base film thus produced is subjected to stretching in the longitudinal and lateral directions; i.e., biaxial stretching. The base film produced through T-die casting molding is subjected to biaxial stretching by means of a tenter process. The base film produced through inflation molding is subjected to biaxial stretching by means of a tubular process. In the course of biaxial stretching by means of a tenter process, longitudinal stretching may be carried out simultaneous with lateral stretching, or longitudinal stretching and lateral stretching may be carried out separately; i.e., multi-stage biaxial stretching may be carried out. The length (or the width) of the thus-stretched film is 1.5 to 20 times, preferably 2 to 17 times, more preferably 3 to 15 times, the length (or the width) of the base film. Stretching conditions, including heating temperature and stretching rate, are appropriately determined in consideration of, for example, physical properties of [I] the propylene polymer, physical properties of [II] the olefin-based polymer, the incorporation ratio between these polymers, melting characteristics of the resin composition, the thickness of a base film for stretching, and stretching magnification. If desired, after completion of biaxial stretching, the shrink film of the present invention may be subjected to heat treatment under appropriate conditions.

Basically, the wrap film or shrink film of the present invention is a single-layer film formed from the aforementioned resin composition. However, the wrap film or shrink film may be a multi-layer film containing at least one layer formed from the resin composition. The multi-layer film may be formed from a resin composition in which [I] the specific propylene polymer employed in the present invention satisfies the aforementioned requirements; or a resin composition which differs from the aforementioned resin composition in formulation of an additive, wherein [I] the propylene polymer satisfies the aforementioned requirements and compositional proportion.

The multi-layer film may contain a layer formed from the resin composition for forming the wrap film or shrink film of the present invention, and at least one layer formed from a resin appropriately selected from olefin-based resins other than [II] the above-specified olefin-based polymer. In such a case, the proportion of the layer formed from the resin composition containing [I] the specific propylene polymer is 1 to 99%, preferably 20 to 80%. Preferably, the layer constitutes at least one outer layer of the multi-layer film, in view that effects of the present invention can be obtained. The aforementioned olefin-based resin may be appropriately selected from the above-specified examples of [II] the olefin-based polymer contained in the aforementioned resin composition.

The wrap film thus produced of the present invention exhibits excellent safety, flexibility, wrapping-ability (adhesion), transparency, restoration from deformation, poking resistance, and cutting-ability. In addition, since the wrap film does not generate a toxic substance when incinerated, the film is environmentally friendly. Therefore, the wrap film of the present invention is suitable for packaging foods placed on foaming-resin-made trays for storage in a refrigerator or a freezer, and is suitable for use as a wrap film for commercial or household use.

Meanwhile, the shrink film of the present invention produced above exhibits excellent heat shrinking-ability, side welding characteristics, hot slip characteristics, safety, flexibility, shrink-packaging appearance, transparency, and breakage resistance of a product packaged with the film. In addition, since the shrink film does not generate a toxic substance derived from chlorine when incinerated, the film is environmentally friendly. Therefore, the shrink film of the present invention is suitable for packaging of an individual food product such as a cup noodle product, for packaging of a plurality of products such as yogurt products stored in containers, fruit-processed foods, and dairy foods, for packaging of packs of canned beer, canned juice, etc., and for heat-shrink packaging of various products such as stationery items (e.g., a notebook).

The present invention will next be described in more detail by way of Examples, which should not be construed as limiting the invention thereto.

Production of [I] Propylene Polymer (A) Synthesis of a Complex

Synthesis of (1,2'-dimethylsilylene)(2,1'-dimethylsilylene)-bis(3-trimethylsilylmethylindenyl)zirconium Dichloride In 50 milliliter THF placed in a Schlenk bottle, 3.0 g (6.97 millimole) of a lithium salt of (1,2'-dimethylsilylene)(2,1'-dimethylsilylene)-bis(indene) was dissolved in and the resultant solution was cooled to −78° C. After slowly dropping 2.1 milliliter (14.2 millimole) of Iodomethyltrimethylsilane to the solution, the resultant mixture was stirred at room temperature for 12 hours. The solvent was removed from the mixture by distillation, and subsequently 50 milliliter of ether was added to the residue, which was subsequently washed with a saturated ammonium chloride solution. By drying an organic phase after phase separation of the residue and removing the solvent, 3.04 g (5.88 millimole) of (1,2'-dimethylsilylene)(2,1'-dimethylsilylene)-bis(3-trimethylsilylmethylindene) was obtained (yield: 84%).

Subsequently, 3.04 g (5.88 millimole) of the obtained (1,2'-dimethylsilylene)(2,1'-dimethylsilylene)-bis(3-trimethylsilylmethylindene) and 50 milliliter of ether were placed in a Schlenk bottle under a nitrogen flow. The resultant solution was cooled to −78° C., and 7.6 milliliter (11.7 millimole) of n-BuLi (hexane solution: 1.54 M) was added to the solution, which was then stirred at room temperature for 12 hours. The solvent was removed from the mixture through distillation, and the solid product was washed with 40 milliliter of hexane, to obtain 3.06 g (5.07 millimole) of a lithium salt as an ether addition product (yield: 73%).

The obtained lithium salt was subjected to $^1$H-NMR (90 MHz, THF-$d_8$) measurement. The results are as follows: $\delta 0.04$ (s, 18H, trimethylsilyl), 0.48 (s, 12H, dimethylsilylene), 1.10 (t, 6H, methyl), 2.59 (s, 4H, methylene), 3.38 (q, 4H, methylene), 6.2–7.7 (m, 8H, Ar—H).

The lithium salt was dissolved in 50 milliliter of toluene under a nitrogen flow. The resultant solution was cooled to −78° C., and a suspension of 1.2 g (5.1 millimole) of zirconium tetrachloride in 20 milliliter of toluene, which had been cooled to −78° C., was added dropwise to the solution. After completion of addition, the resultant mixture was stirred at room temperature for six hours. The solvent was removed from the resultant reaction mixture through distillation. The resultant residue was recrystallized from dichloromethane, to obtain 0.9 g (1.33 millimole) of (1,2'-dimethylsilylene) (2,1'-dimethylsilylene)-bis(3-trimethylsilylmethylindenyl)zirconium dichloride (yield: 26%).

The obtained zirconium dichloride was subjected to $^1$H-NMR (90 MHz, CDCl$_3$) measurement. The results are as follows: $\delta 0.0$ (s, 18H, trimethylsilyl), 1.02, 1.12 (s, 12H, dimethylsilylene), 2.51 (dd, 4H, methylene), 7.1–7.6 (m, 8H, Ar—H).

(B) Polymerization of Propylene

A stainless-steel-made autoclave having an agitator and with a capacity of 10 litter was successively received 4 liter of n-heptane, 2 millimole of triisobutylaluminum, 2 millimole of methyl aluminoxane (available from Albemarle Corp.) and 2 $\mu$mole of the foregoing (1,2'-dimethylsilylene)(2,1'-dimethylsilylene)-bis(3-trimethylsilylmethylindenyl) zirconium dichloride. After introducing hydrogen into the autoclave until the interior pressure reached 0.06 MPa (gauge), and while elevating the temperature of the autoclave to 60° C., propylene gas was introduced into the autoclave until the interior pressure reached 0.8 MPa (gauge), to thereby allow polymerization to proceed. During polymerization, propylene gas was continuously introduced into the autoclave by the use of a pressure-regulating apparatus, so as to maintain the interior pressure at 0.8 MPa (gauge). After polymerization was performed at 60° C. for 30 minutes, the resultant product was removed from the autoclave, and the product was dried under reduced pressure, to obtain [I] the propylene polymer.

(C) Evaluation of Propylene Polymer (i) Measurement of a Pentad Fraction

A pentad fraction was measured by means of the above-described method in the description.

(ii) Measurement of an Intrinsic Viscosity [$\eta$]

An intrinsic viscosity [$\eta$] of the polymer was measured at 135° C. in tetralin using an automatic viscometer (model: VMR-053, produced by of Rigosha Co., Ltd.)

(iii) Determination of an Amount of a Component That is Eluted at 25° C. or Lower Through Temperature Rise Chromatography The amount of a component which is not adsorbed onto a filler contained in a TREF column and is eluted from the column (column temperature: 25° C.); i.e., W25 (mass %), was obtained on the basis of an elution curve through the following procedure.

(a) Operation Method

A sample solution was introduced into a TREF column whose temperature was regulated to 135° C., and subsequently the temperature of the column was gradually lowered to 0° C. with a cooling rate of 5° C./hour, and the temperature of the column was maintained at 0° C. for 30 minutes, so that the sample was adsorbed onto a filler. Thereafter, the column was heated to 135° C. with a rising rate of 40° C./hour, and an elution curve was obtained.

(b) Apparatus

TREF column: Silica gel column (4.6$\phi$×150 mm) (produced by GL Sciences Company)

Flow cell: KBr cell (optical path length: 1 mm) (produced by GL Sciences Company)

Liquid feeding pump: SSC-3100 pump (produced by Senshu Science Co., Ltd.)

Valve oven: MODEL554 oven (high temperature type) (produced by GL Sciences Company)

TREF oven: Product of GL Sciences Company

Dual system temperature controller: REX-C100 temperature controller (produced by Rigaku Kogyo Company)

Detector: Infrared detector for liquid chromatography (MIRAN 1A CVF, produced by of FOXBORO Company 10-way valve: Electric valve (produced by Barco Company)

Loop: 500-μliter loop (produced by Barco Company)

(c) Measurement Conditions

Solvent: o-dichlorobenzene

Sample concentration: 7.5 g/litter

Injection amount: 500 μlitter

Pumping flow rate: 2.0 milliliter/minute

Detection wave number: 3.41 μm

Column filler: Chromosorb P (30 to 60 mesh)

Column temperature distribution: within ±0.2° C.

(iv) Measurement of a Molecular Weight Distribution (Mw/Mn)

A Mw/Mn was measured using the following apparatus under the following condition.

GPC apparatus: WATERS 150C

Column: TOSO GMHHR-H(S)HT

Detector: RI detector for liquid chromatography

Solvent: 1,2,4-trichlorobenzene

Measurement temperature: 145° C.

Flow velocity: 1.0 milliliter/minute

Sample concentration: 2.2 mg/milliliter

Injection amount: 160 μlitter

Calibration curve: Universal Calibration

Analytic program: HT-GPC (Ver. 1.0)

(v) DSC Measurement

A differential scanning calorimeter (DSC-7, produced by Perkin Elmer Co., Ltd.) was used. After melting 10-mg sample by heating at 220° C. for three minutes in a nitrogen atmosphere, the melted sample was cooled to −40° C. at a cooling rate of 1° C./minute and a crystallization exothermic curve was prepared. The temperature corresponding to the top of the maximum peak of the exothermic curve was defined as a crystallization temperature (Tc). The sample was maintained at −40° C. for three minutes, and then heated at a temperature rising rate of 10° C./minute, to obtain a melting endothermic amount expressed as (ΔH). The temperature corresponding to the top of the maximum peak of the obtained melting endothermic curve was defined as a melting point (Tm).

(D) Physical Properties of [I] Propylene Polymer (1) Meso pentad fraction (mmmm): 0.45

(2) [rrrr/(1−mmmm)]: 0.044 [rrrr: 0.024]

(3) Intrinsic viscosity [η]: 1.5 decilitter/g (4) Amount of a component which is eluted at 25° C. or lower through temperature-programmed chromatography (W25): 91 mass %

(5) Molecular weight distribution (Mw/Mn): 2.0

(6) Melting point: 81° C.

(7) Melting endotherm (ΔH): 25 J/g (8) Melt flow rate (MFR: 230° C., load: 21.18 N): 6 g/10 minutes

EXAMPLES 1 TO 4

(A) Production of Pellets

A phenol-based antioxidant (Irganox 1010) (500 ppm) and a phosphorus-based antioxidant (Irgaphos 168) (1,000 ppm) were added to [I] the propylene polymer produced above, and the resultant mixture was subjected to extrusion at a resin temperature of 200° C. by the use of a single screw extruder (model: TLC35-20, product of Tsukada Juki Seisakusho Co., Ltd.), to obtain pellets.

(B) Production of Wrap Film

The pellets produced in (A), IDEMITSU PP F-704NP (melt flow rate: 7 g/10 minutes) and IDEMITSU PP F-734NP (melt flow rate: 6 g/10 minutes) (both available from Idemitsu Petrochemical Co., Ltd.) were dry-blended at compositional proportions shown in Table 1. Subsequently, a wrap film (thickness: 20 μm) was formed from the resultant mixture by the use of a VS 40-mm extruder and a T-die casting apparatus (produced by Tanabe Plastic Kikai Co., Ltd.) under the following film formation conditions.

Temperature of the resin at a die outlet: 230° C.

Chill roll temperature: 30° C.

Drawing rate: 18 m/minute (C) Evaluation of Wrap Film

The obtained wrap film was subjected to conditioning at a temperature of 23° C.±2° C. and a humidity of 50±10% for 16 hours or more, and the wrap film was evaluated in terms of the following items at the above temperature and humidity. The evaluation results are shown in Table 1.

(i) Transparency (Haze)

Transparency was Measured in Accordance With JIS K7105.

(ii) Tensile Yield Strength and Tensile Elastic Modulus

Tensile yield strength and tensile elastic modulus were measured through a tensile test in accordance with JIS K7127.

Crosshead speed: 50 mm/minute

Measurement direction: machine direction (MD direction)

(iii) Wrapping-ability 1

The opening of a stainless-steel-made vat (inner dimensions: 125×180 mm, depth: 70 mm) was wrapped with a cut wrap film (160×220 mm). The wrapped vat was allowed to stand at 5° C. for one week. When removal of the film did not occur and wrapping was maintained, rating "A" was assigned, whereas when removal of the film occurred and wrapping was not maintained, rating "C" was assigned.

(iv) Wrapping-ability 2

A cut wrap film (160×170 mm) was placed on the opening of the aforementioned vat such that a first shorter side edge of the film was 30 mm or 50 mm inward from a first shorter side of the vat, and a second shorter side edge of the film was caused to adhere to a second shorter side of the vat. Subsequently, the film was gradually stretched by pinching the center portion of the first shorter side edge, to thereby cover the entire opening of the vat. When the entire opening of the vat could be covered with the film in two cases where the first shorter side edge of the film was 30 mm inward, and 50 mm inward, from the first shorter side of the vat, rating "A" was assigned; when the entire opening of the vat could be covered with the film merely in the case where the first shorter side edge of the film was 30 mm inward from the first shorter side of the vat, rating "B" was assigned; and when the entire opening of the vat could not be covered with the film in the case where the first shorter side edge of the film was 30 mm or 50 mm inward from the first shorter side of the vat, rating "C" was assigned.

(v) Poking Resistance

The opening of the aforementioned vat was wrapped with a wrap film in a manner similar to the case where wrapping-ability 1 was evaluated, and subsequently the center portion of the film was slowly poked with a finger. When the film was not broken until the center portion of the film reached the bottom of the vat, rating "A" was assigned, and when the film was broken before the center portion of the film reached the bottom of the vat, rating "C" was assigned.

(vi) Restoration From Deformation (Elasticity)

A dice (size of each side: 45 mm) was placed on the center of the bottom of the aforementioned vat, and the vat was wrapped with a wrap film in a manner similar to the case where wrapping-ability 1 was evaluated. Subsequently, the center portion of the film was slowly poked with a finger. When the center portion of the film reached the dice placed on the bottom of the vat, the finger was removed from the film. The state of the film was observed three minutes after removal of the finger. When the film was restored to the original state, rating "A" was assigned; when a pouch-like mark remained in the film, rating "B" was assigned; and when the film was broken, rating "C" was assigned.

COMPARATIVE EXAMPLE 1

A commercially available polyvinylidene-chloride-made wrap film [trade name: Saran Wrap R, available from Asahi Chemical Industry Co., Ltd.] was evaluated in a manner similar to that of Example 1. The results are shown in Table 1.

TABLE 1

| Compositional proportions (mass %) | Ex. 1 | Ex. 2 | Ex. 3 | Ex. 4 | Comp. Ex. 1 |
|---|---|---|---|---|---|
| [I] Propylene polymer | 70 | 70 | 90 | 50 | — |
| [II] Olefin-based polymer | | | | | |
| F-704NP | 30 | — | 10 | 50 | — |
| F-734NP | — | 30 | — | — | — |
| Evaluation of wrap film | | | | | |
| Haze (%) | 0.3 | 0.3 | 0.5 | 0.6 | 0.3 |
| Tensile elastic modulus (MPa) | 130 | 130 | 70 | 270 | 1250 |
| Tensile yield strength (MPa) | 8.3 | 8.0 | 6.4 | 11.4 | No yield point |
| Wrapping-ability 1 | A | A | A | A | A |
| Wrapping-ability 2 | A | A | A | B | C |
| Poking resistance | A | A | A | A | C |
| Restoration from deformation | A | A | A | A | C |

In Table 1, "Ex." and "Comp." are abbreviations of "Example" and "Comparative" respectively.

EXAMPLES 5 TO 8, COMPARATIVE EXAMPLES 2 AND 3

(A) Production of Pellets

A phenol-based antioxidant (Irganox 1010, available from Ciba Specialty Chemicals COrp.) (1,000 ppm) and a phosphorus-based antioxidant (P-EPQ, available from Ciba Specialty Chemicals Corp.) (500 ppm) were added to [I] the propylene polymer produced above, and the resultant mixture was subjected to extrusion at a resin temperature of 200° C. by the use of a single screw extruder (model: TLC35-20, produced by Tsukada Juki Seisakusho Co., Ltd.), to obtain pellets.

(B) Production of Base Film

The pellets produced in (A), IDEMITSU PP F-300S (melt flow rate: 3 g/10 minutes, available from Idemitsu Petrochemical Co., Ltd.), and a propylene-based random copolymer described in Example 1 of Japanese Patent Application Laid-Open (kokai) No. 10-152531 (R-PP, melt flow rate: 2.3 g/10 minutes, ethylene content: 4.2 mass %, melting point: 137.2° C.) were dry-blended at compositional proportions [mass %] shown in Table 2. Subsequently, a tubular, base film (thickness: 240 μm) was produced from the resultant mixture by the use of a single three-layer bottom-blowing water-cooling film formation apparatus including three 40-mmϕ extruders and a 50-mmϕ circular die, at a die outlet temperature of 230° C.

(C) Production of Stretched Shrink Film

The base film produced in (B) was subjected to biaxial stretching at a stretching temperature of 100 to 120° C. and stretching magnifications (longitudinal: ×6, lateral: ×5) by use of a tubular-type biaxial stretching film formation apparatus including upper and lower nip rollers and a heating furnace provided between the nip rollers, the heating furnace including a preliminary heating apparatus and a heating apparatus, to thereby produce a stretched film. Subsequently, the stretched film was subjected to heat treatment at 70° C. for 10 seconds by use of the aforementioned stretching apparatus, to thereby produce a shrink film (thickness: 12 μm). The shrink film was evaluated by means of the methods described below. The evaluation results are shown in Table 2.

(D) Evaluation of Shrink Film

The shrink film was subjected to conditioning at a temperature of 23° C.±2° C. and a humidity of 50±10% for 16 hours or more, and the shrink film was evaluated in terms of the following items at the above temperature and humidity. The evaluation results are shown in Table 2.

(i) Transparency (Haze)

Transparency was measured in accordance with JIS K7105.

(ii) Shrink Packaging Appearance

A commercially available instant noodles (stir-fried Chinese noodles) product having a rectangular parallelepiped shape was loosely packaged with the foregoing shrink film, and the edges of the film were bonded together through side welding. The packaged product was placed on a conveyer, and caused to pass through a hot-air-circulation-type heating furnace (model: NS-350, produced by of Kyowa Electric Co., Ltd.), to cause shrinkage of the film. After heat shrinkage, the size of corner flange and the amount of wrinkles generated on a corner portion were visually evaluated.

(iii) Hot Slip Characteristics

Hot slip characteristics were evaluated on the basis of occurrence of blocking when a plurality of the foregoing shrink-packaged instant noodle products were caused to adhere to one another at the outlet of the heating furnace, and ease of passage of the adhered products through the conveyer.

(iv) Heat Shrinkage Stress

The procedure of (ii) above was repeated, except that a commercially available instant noodle product was somewhat tightly packaged with the foregoing shrink film, to thereby obtain a shrink-packaged product, and the product was subjected to visual evaluation. When deformation of the product was not observed, rating "A" was assigned, whereas when deformation of the product was observed, rating "C" was assigned.

In Comparative Example 2, a shrink film was formed solely from IDEMITSU PP F-300S (available from Idemitsu Petrochemical Co., Ltd.) serving as a polypropylene resin. In Comparative Example 3, a shrink film was formed solely from R-PP, which was employed in Examples 7 and 8.

TABLE 2

| | | Compositional proportions (mass %) | | | | | |
|---|---|---|---|---|---|---|---|
| | | Ex. 5 | Ex. 6 | Ex. 7 | Ex. 8 | Comp. Ex. 2 | Comp. Ex. 3 |
| [I] Propylene polymer | | 70 | 50 | 70 | 50 | — | — |
| [II] Olefin-based polymer | F-300S | 30 | 50 | — | — | 100 | — |
| | R-PP | — | — | 30 | 50 | — | 100 |
| Evaluation of shrink film | Haze (%) | 0.2 | 0.2 | 0.4 | 0.5 | 0.5 | 2.0 |
| | Glossiness (%) | 154 | 153 | 148 | 145 | 146 | 127 |
| | Shrink packaging appearance | Good | Good | Good | Good | Poor | Good |
| | Hot slip characteristics | Good | Good | Good | Good | Good | Good |
| | Heat shrinkage stress | A | A | A | A | C | C |

In Table 2, "Ex." and "Comp." are abbreviations of "Example" and "Comparative" respectively.

Industrial Applicability

The wrap film of the present invention does not generate a toxic gas derived from chlorine, such as hydrogen chloride gas or dioxin, when incinerated; is environmentally friendly; and exhibits safety and transparency comparable to those of a widely used wrap film formed from a polyvinylidene chloride resin. In addition, the wrap film of the present invention is superior to the polyvinylidene-chloride-made wrap film in terms of poking resistance and restoration from deformation.

Since the shrink film of the present invention contains no chlorine, the shrink film does not generate a toxic gas derived from chlorine, such as hydrogen chloride gas or dioxin, when incinerated. Since the shrink film contains no plasticizer, when the film is employed, problems caused by elution of a plasticizer do not arise. Therefore, the shrink film exhibits safety and is environmentally friendly. In addition, the shrink film is excellent in terms of heat shrinking-ability during packaging, low-temperature shrinking-ability, melting-breakage resistance, side welding characteristics, hot slip characteristics, and appearance after packaging (i.e., the edge of the film adheres to an object without forming wrinkles). Furthermore, the shrink film of the present invention exhibits considerably excellent transparency and glossinessiness as compared with a conventional polyolefin-based resin shrink film, and enables production of a shrink-packaged product of high value. Therefore, the shrink film of the present invention is envisaged to be employed in a variety of fields.

What is claimed is:

1. A wrap film formed from a resin composition comprising [I] a propylene polymer in an amount of 1 to 99 mass %, and [II] an olefin-based polymer in an amount of 99 to 1 mass %, wherein [I] the propylene polymer satisfies the following requirements of:

(1) a meso pentad fraction (mmmm) is 0.2 to 0.6, and
    (2) a racemic pentad fraction (rrrr) and (1−mmmm) satisfy the following relation:

$[rrrr/(1-mmmm)] \leq 0.1$.

2. The wrap film according to claim 1, wherein said [I] propylene polymer satisfies the following requirement of:

(3) an intrinsic viscosity [η] measured at 135° C. in tetralin is 1 to 3 deciliter/g.

3. The wrap film according to claim 1, wherein said [I] propylene polymer satisfies the following requirement of:

(4) an amount of a component which is eluted at 25° C. or lower through temperature-programmed chromatography (W25) is 20 to 100 mass %.

4. The wrap film according to claim 1, wherein said [I] propylene polymer is polymerized by the use of a metallocene catalyst containing a promoter and a transition metallic compound in which a cross-linking structure is formed via two cross-linking groups.

5. The wrap film according to claim 1, wherein said [II] olefin-based polymer is a propylene-based polymer.

6. A multi-layer wrap film comprising at least one layer formed from a resin composition as recited in claim 1.

7. A stretched shrink film formed from a resin composition comprising [I] a propylene polymer in an amount of 1 to 99 mass %, and [II] an olefin-based polymer in an amount of 99 to 1 mass %, wherein [I] the propylene polymer satisfies the following requirements of:

(1) a meso pentad fraction (mmmm) is 0.2 to 0.6, and
    (2) a racemic pentad fraction (rrrr) and (1−mmmm) satisfy the following relation:

$[rrrr/(1-mmmm)] \leq 0.1$.

8. The shrink film according to claim 7, wherein said [I] propylene polymer satisfies the following requirement of:

(3) an intrinsic viscosity [η] measured at 135° C. in tetralin is 1 to 3 deciliter/g.

9. The shrink film according to claim 7, wherein said [I] propylene polymer satisfies the following requirement of:

(4) an amount of a component which is eluted at 25° C. or lower through temperature rise chromatography (W25) is 20 to 100 mass %.

10. The shrink film according to claim 7, wherein said [I] propylene polymer is polymerized by the use of a metallocene catalyst containing a promoter and a transition metallic compound in which a cross-linking structure is formed via two cross-linking groups.

11. A shrink film according to claim 7, wherein said [II] olefin-based polymer is a propylene-based polymer.

12. A multi-layer shrink film comprising at least one layer formed from a resin composition as recited in claim 7.

* * * * *